Patented July 7, 1936

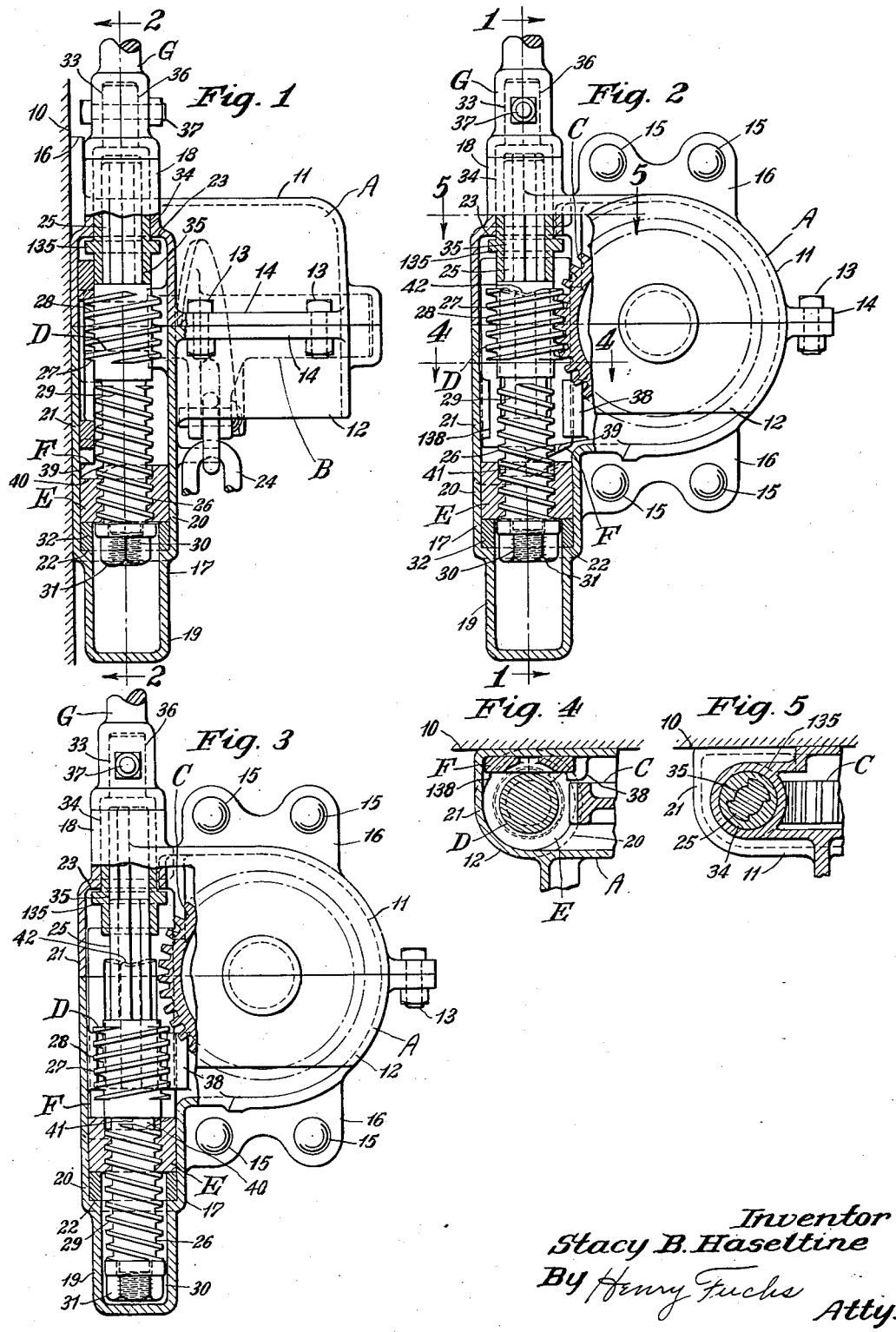

2,046,512

UNITED STATES PATENT OFFICE 2,046,512

POWER HAND BRAKE

Stacy B. Haseltine, Chicago, Ill., assignor to W. H. Miner, Inc., Chicago, Ill., a corporation of Delaware Application January 17, 1935, Serial No. 2,144

17 Claims. (Cl. 74—505)

This invention relates to improvements in power hand brakes especially adapted for use in connection with railway cars.

One object of the invention is to provide a hand brake mechanism including a chain winding drum and worm gear means for actuating the drum, wherein the driving worm gear element is automatically disengaged from the cooperating driven gear member after a predetermined backing off of the brakes through rotation of the actuating means for the driving worm gear element in brake releasing direction, and wherein the driving connection between the worm gear element and the worm gear member is automatically re-established upon rotation of the actuating means in brake tightening direction.

Another object of the invention is to provide in a hand brake mechanism including a chain winding drum, a driven worm wheel member operatively connected to the winding drum to rotate the latter, and a driving worm member normally in mesh with the threads of the worm wheel member, means for automatically effecting separation of the worm member from the worm wheel after a predetermined amount of backing off of the brakes to completely release the brakes, during rotation of the worm in a direction to unwind the chain from the drum, and for automatically effecting reengagement of the worm member with the worm wheel when the worm member is rotated in direction to wind the chain on the drum, through displacement of the worm member in axial direction, tangent to the worm wheel member, wherein said displacement of the worm member is produced by cooperating screw means in the form of a nut constantly in threaded engagement with the worm member.

A more specific object of the invention is to provide a brake mechanism of the character described in the preceding paragraph, wherein the nut of the screw means is rotatable with the worm member while the worm member is in full driving engagement with the worm wheel and the worm member is rotated in chain tightening direction, but held against rotation while the worm and worm wheel are completely disengaged from each other and during the time that the worm is moved from said disengaged position to engaged relation with the worm wheel, thus assuring reliable operation of the brakes at all times.

Other objects of the invention will more clearly appear from the description and claims hereinafter following.

In the drawing forming a part of this specification, Figure 1 is a vertical sectional view through a portion of the end wall of a car, illustrating my improved hand brake mechanism in connection therewith, said improved mechanism being shown partly in side elevation and partly in vertical section, the vertical section corresponding substantially to the line 1—1 of Figure 2. Figure 2 is a part front elevational and part vertical sectional view of the brake mechanism shown in Figure 1, the section corresponding substantially to the line 2—2 of Figure 1. Figure 3 is a view similar to Figure 2, but showing the parts in a different position. Figures 4 and 5 are horizontal sectional views, partly broken away, corresponding respectively to the lines 4—4 and 5—5 of Figure 2.

In said drawing, 10 indicates a portion of the end wall of a railway car, on which my improved hand brake mechanism is mounted. The improved mechanism comprises broadly a housing A; a chain winding drum B; a worm wheel C; a worm element D; a nut E; a latch F; and an operating shaft or staff G.

The housing A comprises upper and lower sections 11 and 12, which are secured together by bolts 13—13 or any other similar suitable fastening means extending through the flanges 14—14 of said sections. The housing A is fixed to the wall 10 of the car by securing elements 15—15 extending through flanges 16—16 provided on the upper and lower sections of the housing. The housing has a vertical enlarged section 17 at the left hand side thereof, as viewed in Figures 2 and 3. The section 17 of the housing A has a cylindrical top portion 18, a cylindrical bottom portion 19, a cylindrical portion 20 above said portion 19, and a portion 21 between the portions 18 and 20, said portion 21 being of the cross sectional shape shown in Figure 4. The cylindrical bottom portion 20 merges with the intermediate portion 21 and is of larger diameter than the portion 19, as clearly shown in Figures 1, 2, and 3, thereby presenting an annular shoulder 22 between said portions 19 and 20. The portion 19 is closed at the bottom, thereby providing a reservoir for lubricant. The cylindrical portion 18 is open at the upper end, as shown in Figures 1, 2, and 3, and an internal shoulder 23 is provided between the portions 18 and 21.

The chain winding drum B is supported in the housing A for rotation about a horizontal axis. The worm wheel C is coaxial with the chain winding drum B and is fixed to the drum. The worm wheel C and the drum B may be formed as a single casting. Suitable bearings are provided in the housing to rotatably support the worm wheel C and the chain winding drum B. The brake chain, which is indicated by 24, leads to the brake rigging proper of the car and is anchored to the chain winding drum B in the usual manner. As shown in Figures 1 and 3, the bottom of the housing is provided with a suitable opening to accommodate the chain 24.

The worm D is in the form of a vertically disposed shaft having upper and lower sections 25 and 26 and an intermediate enlarged section 27. The section 25 is of the cross section shown in Figure 5 and the sections 26 and 27 are both cylindrical. The section 27 is provided with right threads 28 and the section 25 is provided with left threads 29. The extreme lower end of the worm element D is reduced in diameter as indicated at 30, said reduced section being threaded to accommodate a nut 31.

The nut E, which is mounted in the section 17 of the housing, is threaded on the section 26 of the worm element D. The nut is of cylindrical outline and is freely rotatable in the bearing provided by the portion 20 of the section 17 of the housing and is supported on a thrust ring or washer 32 resting on the annular shoulder 22. Inasmuch as the nut E is in threaded engagement with the threads 29 of the worm D, it forms a rotatable support for said worm.

The shaft or staff G is provided with the usual hand wheel (not shown) at the upper end thereof. The shaft G includes a coupling member 33 secured to the lower end thereof. The coupling member 33 includes a sleevelike section 34 having an opening 35 of the cross section shown in Figure 5, within which the section 25 of the worm D slidingly fits. The coupling member 33 forms a support for the upper end of the worm and is rotatable in the bearing formed by the portion 18 of the section 17 of the housing A. The coupling member 33 has an annular rib 135, adjacent the lower end thereof, which limits the upward movement of said coupling member by engagement with the shoulder 23 of the housing A. The extreme upper end of the coupling member 33 is reduced in cross section, thereby providing a stem by which the same is connected to the brake staff proper. The stem of the coupling member 33 is of non-circular cross section and fits in a socket portion 36 at the bottom end of the brake staff, whereby said coupling member is rotated in unison with the staff. To retain the coupling member in position on the staff G, the same is secured by a bolt 37 extending through the stem portion of the coupling member and the socket portion 36 of the brake staff.

The latch F, which is vertically slidable in the section 17 of the housing A, is in the form of an elongated plate. The lower end of the latch F is guided for vertical movement in the section 17 between the lug 38 on the back wall of the housing A and the opposed side wall of said housing. As shown in Figure 4, said side wall is provided with a rib 138 overhanging the plate and the lug 38 is of hook shape to overhang the opposite side of the front face of said latch plate F. The upper section of the plate F is guided between the back wall of the housing and the sleevelike section 34 of the coupling member 33 and the side walls of the housing section 17. The rear side of the latch plate F has sliding engagement with the back wall of the housing A. At the lower end, the latch plate F is provided with a ratchet tooth 39 adapted to engage in a notch 40 in the top of the nut E. The bottom wall of the notch 40 is inclined, as clearly indicated in Figure 2. The notch 40 also has a vertical wall 41, which cooperates with the vertical face of the ratchet tooth 39 of the latch plate F. Near the upper end, the latch plate F is provided with an abutment projection 42 of the shape shown in Figure 2, which overhangs the threads 28 of the section 27 of the worm D and normally rests on the top of said threads.

In Figures 1 and 2 of the drawing, the parts of the brake mechanism are shown in normal position in which rotation of the brake staff G and the worm D in right hand direction will effect rotation of the chain winding drum B to wind the chain thereon and tighten the brakes. In releasing the brakes, the staff G is rotated in a left hand direction, thereby causing rotation of the drum B in a direction to unwind the chain and back off the brakes. During this action the worm D will be fed downwardly due to engagement of the threads 29 with the nut E. This operation continues until the brakes have been backed off to a predetermined extent when the worm D will assume the position shown in Figure 3. The worm is thus completely disengaged from the worm wheel C, permitting the chain winding drum B to rotate freely and completely release the brakes. Upon rotation of the staff G in brake tightening direction, rotation of the worm D will cause the worm to be screwed upwardly in the nut E due to the threaded engagement between the nut E and the section 26 of the worm D. In this connection it is pointed out that the sliding latch plate F, which normally is held in the position shown in Figures 1 and 2 by shouldered engagement with the threads 27 of the section 25 of the worm D, will be lowered during the downward movement of the worm, thereby engaging the ratchet tooth 39 of the latch within the notch 40 of the nut E, as shown in Figure 3. The nut E is thus held against rotation in a right hand direction, thereby forcing the worm D to be threaded upwardly through said nut during the initial rotation of the brake staff G in right hand or brake tightening direction. Through the upward movement of the worm D, the threads 27 will be brought into engagement with the tooth or threads of the worm wheel C, as shown in Figures 1 and 2. During further rotation of the brake staff G in right hand or brake tightening direction, the chain drum B will be rotated, as hereinbefore pointed out, to fully apply the brakes.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a winding element; of a worm wheel rotatable with said element; a worm engageable with the worm wheel to rotate the latter and the winding element; and constantly interengaged cooperating screw and nut means actuated, through rotation of the worm in one direction, to bring the worm into engagement with the worm wheel, and actuated, through rotation of the worm in a reverse direction, to disengage the worm from the worm wheel.

2. In a hand brake mechanism, the combination with a rotary winding element; of worm gear means for rotating the drum including cooperating worm and worm wheel members;

means for actuating one of said members; and constantly interengaged cooperating screw and nut means automatically controlled by the operation of said actuating means for engaging said members with each other when the actuating means is rotated in one direction and disengaging said members from each other when said actuating means is rotated in a reverse direction.

3. In a hand brake mechanism, the combination with a winding element; of a worm wheel rotatable with said element; a rotary and axially movable driving element having threads engaging the threads of the worm wheel; screw means, both axially movable and rotatable with said driving element; a nut held against axial movement, said nut being constantly in threaded engagement with said screw; and means for rotating said driving element in reverse directions to screw said means into and out of the nut and move said driving member axially in reverse directions to respectively disengage said driving element from the worm wheel and reengage the same therewith.

4. In a hand brake mechanism, the combination with a rotary winding element; of means for rotating said element including cooperating worm and worm wheel members, said worm being rotatable and axially displaceable; and means for displacing said worm member in axial direction upon rotation thereof, comprising a screw rotatable and axially movable with the worm, and a nut, said nut being threaded on said screw and held against axial displacement.

5. In a hand brake mechanism, the combination with a rotary winding element; of means for rotating said element including cooperating worm and worm wheel members, said worm being rotatable and axially displaceable; and means for displacing said worm member in axial direction upon rotation thereof, comprising a screw rotatable and axially movable with the worm, a rotatable nut threaded on the screw, and means for holding said nut against axial movement.

6. In a hand brake mechanism, the combination with a rotary winding element; of means for rotating said element including cooperating worm and worm wheel members, said worm being rotatable and axially displaceable; means for displacing said worm member in axial direction upon rotation thereof, comprising a screw rotatable and axially movable with the worm, a rotatable nut threaded on the screw, and means for holding said nut against axial movement; and means controlled by axial displacement of the worm for locking the nut against rotation in one direction.

7. In a hand brake mechanism, the combination with a rotary winding element; of a worm wheel rotatable with said element; a rotary and axially displaceable driving member, said driving member having two threaded sections, the threads of one of said sections being engageable with said worm wheel; a rotary nut constantly engaged with the other threaded section; and means for holding said nut against axial displacement.

8. In a hand brake mechanism, the combination with a rotary winding element; of a worm wheel rotatable with said element; a rotary and axially displaceable driving member, said member having a right threaded section and a left threaded section, the threads of one of said sections being engageable with said worm wheel; a rotary nut constantly engaged with the other threaded section; and means for holding said nut against axial displacement.

9. In a hand brake mechanism, the combination with a rotary winding element; of a worm wheel rotatable with said element; a rotary and axially displaceable driving member, said member having a right threaded section and a left threaded section, the threads of one of said sections being engageable with said worm wheel; a rotary nut constantly engaged with the other threaded section; means for holding said nut against axial displacement; and means controlled by axial displacement of said driving member for locking said nut against rotation in one direction.

10. In a hand brake mechanism, the combination with a rotary winding element; of a worm wheel rotatable with said element; a rotary and axially displaceable driving member having right and left threaded sections thereon, one of said sections being engageable with the worm wheel to rotate the same; a rotary nut constantly engaged with the other threaded section; and means for holding said nut against axial movement.

11. In a hand brake mechanism, the combination with a rotary winding element; of a worm wheel rotatable with said element; a rotary and axially displaceable driving member having right and left threaded sections thereon, one of said sections being engageable with the worm wheel to rotate the same; a rotary nut constantly engaged with the other threaded section; means for holding said nut against axial movement; and means rendered operative by movement of said driving member into the nut, for holding said nut against rotation when the driving member is rotated in a direction to unscrew the same from the nut.

12. In a hand brake mechanism, the combination with a rotary winding element; of a worm wheel rotatable with said element; a rotary and axially displaceable driving member having right and left threaded sections, one of said threaded sections being of greater length than the other, the section of lesser length being engageable with the worm wheel; and a rotary nut, held against axial displacement, said nut being threaded on said threaded section of greater length.

13. In a hand brake mechanism, the combination with a rotary winding element; of a worm wheel rotatable with said element; a rotary and axially displaceable driving member having right and left threaded sections, one of said threaded sections being of greater length than the other, the section of lesser length being engageable with the worm wheel; a rotary nut, held against axial displacement, said nut being threaded on said threaded section of greater length; and ratchet means for holding said nut against rotation in one direction.

14. In a hand brake mechanism, the combination with a rotary winding element; of a worm wheel rotatable with said element; a rotary and axially displaceable driving member having right and left threaded sections, one of said threaded sections being of greater length than the other, the section of lesser length being engageable with the worm wheel; a rotary nut, held against axial displacement, said nut being threaded on said threaded section of greater length; and ratchet means for holding said nut against rotation in one direction, said ratchet means including an element actuated by displacement of said driving member for controlling the operation of said ratchet means.

15. In a hand brake mechanism, the combination with a rotary winding element; of a worm wheel rotatable with said element; a rotary and axially displaceable driving member having right and left threaded sections, one of said threaded sections being of greater length than the other, the section of lesser length being engageable with the worm wheel; a rotary nut, held against axial displacement, said nut being threaded on said threaded section of greater length; and a sliding latch member engageable with the nut, said latch member and nut having cooperating ratchet teeth to hold said nut against rotation in one direction while permitting rotation thereof in a reverse direction.

16. In a hand brake mechanism, the combination with a rotary winding element; of a worm wheel rotatable with said element; a rotary and axially displaceable driving member having right and left threaded sections, one of said threaded sections being of greater length than the other, the section of lesser length being engageable with the worm wheel; a rotary nut, held against axial displacement, said nut being threaded on said threaded section of greater length; a sliding latch member cooperating with said nut, said latch member and nut having cooperating ratchet teeth thereon to hold said nut against rotation in one direction while permitting rotation thereof in a reverse direction; and cooperating means on said latch and driving members for completely disengaging the latch member from the nut to permit rotation of the latter when the threads of lesser length of the driving member are completely engaged with the threads of the worm wheel.

17. In a hand brake mechanism, the combination with a rotary winding element; of a worm wheel fixed to said element to rotate therewith; a rotary driving member having a right threaded section and a left threaded section, said right threaded section being engageable with the threads of the worm wheel; a rotary left threaded nut, said nut being constantly engaged with the left threaded section of the driving member; means for holding said nut against axial movement; and ratchet means thrown into action by operation of said driving member for holding said nut against rotation in one direction.

STACY B. HASELTINE.